(12) United States Patent
Parker-Stephen

(10) Patent No.: US 7,593,522 B2
(45) Date of Patent: Sep. 22, 2009

(54) CALL CENTER USER INTERFACE AND METHODS OF USING SAME

(75) Inventor: Rachel Parker-Stephen, Orange, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 306 days.

(21) Appl. No.: 11/372,285

(22) Filed: Mar. 9, 2006

(65) Prior Publication Data

US 2007/0211881 A1 Sep. 13, 2007

(51) Int. Cl.
*H04M 3/00* (2006.01)
(52) U.S. Cl. .................. 379/265.01; 709/202; 709/204
(58) Field of Classification Search ............ 379/265.01; 705/38
See application file for complete search history.

(56) References Cited

U.S. PATENT DOCUMENTS

| | | | |
|---|---|---|---|
| 6,205,412 B1 | 3/2001 | Barskiy et al. | |
| 6,490,350 B2 | 12/2002 | McDuff et al. | |
| 6,763,104 B1 | 7/2004 | Judkins et al. | |
| 6,782,091 B1 | 8/2004 | Dunning, III | |
| 6,826,745 B2 | 11/2004 | Coker et al. | |
| 2002/0022986 A1 | 2/2002 | Coker et al. | |
| 2003/0179877 A1 | 9/2003 | Dezonno et al. | |
| 2004/0073508 A1* | 4/2004 | Foster et al. | 705/38 |
| 2005/0053224 A1 | 3/2005 | Pennington, Jr. et al. | |
| 2005/0111651 A1 | 5/2005 | Chavez et al. | |
| 2005/0193055 A1* | 9/2005 | Angel et al. | 709/202 |

* cited by examiner

*Primary Examiner*—Creighton Smith
(74) *Attorney, Agent, or Firm*—Hanley, Flight, & Zimmerman, LLC

(57) ABSTRACT

Methods and apparatus for a call center system are disclosed for an agent to answer calls from customers of a business. A disclosed example call center system has a database to store customer data and a script generator to provide scripts for dialog with a customer. The system also may include an agent terminal with a phone and a user interface. The user interface screen has a passive focus screen area to display at least one of customer data and a reason for the customer inquiry to the call center. An active communicate screen area displays a script of dialog text relating to the customer inquiry. An active actions screen area displays information to launch an action to facilitate a response to the customer inquiry. A passive support screen area displays information relating to actions available to the call center representative in the active communicate and actions screen areas.

22 Claims, 13 Drawing Sheets

| Account | Product | CTI | Contact Guide | Carriers | Posted Orders | CSR | Local Toll | Accounts Accessed | Notes |
|---|---|---|---|---|---|---|---|---|---|

Account Information

Talked With: _____

Account Number(s): 530 343-0004 212 (BTN)

Pending Order(s): C25580701  Detail

Bill Name and Address: SBC EASE PROJECT-ETE 2600 CAMINO RAMON RM 4S750W

E-Mail Address and Permissions: CNF  sbctest@sbc.com  N

Service Address: 1370 E LASSEN AV CHICO

| Date | Time | RP | Notation | User | Type | PN | ACT | FU |
|---|---|---|---|---|---|---|---|---|
| 010606 | 09:26A | NONE | REVIEWED ACCOUNT FOR TESTING PURPOSES | RS9586 IU | CHK | | | |
| 010606 | 08:23A | CUST | BROWSER CLOSED | RS9586 IU | DASH | | | |
| 010606 | 07:44A | CUST | ACCESSED ACCOUNT IN ERROR | JD0040 IU | QUIK | | | |
| 010606 | 07:25A | CUST | ACCESSED ACCOUNT IN ERROR | JD0040 IU | QUIK | | | |
| 122205 | 01:10P | NONE | CALLER AUTHENTICATION SUCCESSFUL | KK3273 GV | DASH | | | |
| 122205 | 12:47P | NONE | CALLER AUTHENTICATION SUCCESSFUL | KK3273 GV | DASH | | | |
| 122205 | 12:44P | NONE | CALLER AUTHENTICATION SUCCESSFUL | EH2948 GV | DASH | | | |

Buttons: Add Note, Quick Note, Clear, More, Find

View Collection Notes

Add Follow-Up Note

Main | Call Plan

☐ Repeat Caller    ☐ Unresolved Issue    ☐ Irate Caller

Transaction Definition

Billing  ⊕ SBC Billing
Billing  ⊕ Affiliate Billing
        Confirm Receipt of Payment ☐ Early Call Termination Transaction Status

[Open Account] [Refresh] [Search] Transfer [Go To]

EORS: _____
◉ Natural Language  ○ And, Or, Not
No results found

Alerts: Duplicate  Growth

[View] [Next]

CCTP Desktop

File  Navigation  Help

| Account | Product | CTI |

Account Information

Talked With:

Account Number(s): 530 343-0004 212 (BTN)

Pending Order(s): C25580701   Detail

Bill Name and Address:
SBC EASE PROJECT-ETE
2600 CAMINO RAMON
RM 4S750W

E-Mail Address and Permissions: CNF  sbctest@sbc.com  N

Service Address:
1370 E LASSEN AV
CHICO

Open Account  Refresh  Transfer  Go To

EORS  Search

● Natural Language  ○ And,Or,Not

West OMC-Other Offers
West OMC-SBC Long Distance
West OMC-Cingular
West OMC-Packages
West OMC-Internet Service «Prev  1 To 5 Of 9  Next»

Alerts:  Duplicate  Growth

---

| Contact Guide | Carriers | Posted Orders | CSR | Local Toll | Accounts Accessed | Notes |

NodeID: d_en_r_xx_xx_dktp_cf_offrprdts_ofrprod1

1. Use the Offer tab to present customer with each Offer.
2. Depress each individual Offer to display available Offer Description, Benefits, Legal Disclosure, etc.
3. Disposition each Offer accordingly base on customer response.
4. If the disposition is not correct for this offer, change the customer response from the drop down list on the offer window.
5. Once all offers have been presented and dispositioned, click "Next" to proceed.

Note: Additional product information is available in EORS.

— 312

| Main | Call Plan | Bill | Repair | Additional Offers — 560 | DQ / Offer — 514 |

Recommended Offers — 558                                          Offer — 550

Customer Response

☑ *       JustCall Worldwide II — 552
☑         Personal Choice
☑         Privacy Manager
☑         SBC e-Bill and Autopay

— 554

|  | Difference/Month | Difference/Day | Current Monthly Rate | Proposed Monthly Rate | Connection Charges |
|---|---|---|---|---|---|
| Offer Rates | $3.99 | $0.13 | $20.37 | $24.36 — 562 | $0.00 |

| Benefit Statements | Transition Statements | Offer Descriptions | Address Concerns | Legal Disclosures | Discovery Q & A |

(Check Exchange Plus for specific country's per minute rate) "Based on what I see on your account, I recommend the JustCall Worldwide II plan from SBC Long Distance. For a low monthly rate of $3.99, make the calls you want day or night, knowing that you will be receiving competitive rates on all of your direct-dialed international calls. With this plan, all of your direct-dialed calls to (insert country) will be billed at just $.XX per minute.

— 556

* = Mandatory Offer

View  Next  Next

CALL CENTER USER INTERFACE AND METHODS OF USING SAME

FIELD OF THE DISCLOSURE

This disclosure relates generally to call center systems, and, more particularly, to a user interface for call center employees and methods for using the same to handle customer requests.

BACKGROUND

As consumer products and services have grown more complex, the need to provide support to consumers purchasing these products and/or services has grown. Traditionally, this support has been provided by live agents over the telephone. A call center is a central location where multiple agents answer telephone calls from consumers looking for support for products and/or services. A business may have several call centers. In addition, a business may hire a company to provide call center services for its customers.

Businesses that wish to maintain a call center evaluate the number of calls that will be handled simultaneously in order to determine the number of agents that must be available. To maintain customer satisfaction, businesses do not want to have customers waiting on hold for extended periods of time. To maintain efficiency, businesses do not want to have agents waiting for calls because maintaining many agents is expensive. Accordingly, it is desirable for a business to increase the number of calls which agents can handle at a call center.

Typically, agents interact with a computer via one or more interfaces to access data which allows the agent to respond to a customer's inquiries. Such computers allow an agent to obtain information about the caller, as well as display dialog to more efficiently service a caller. Such computers may also allow an agent to access other resources of the company to service the caller's requests. However, one source of inefficiency in present call center interfaces is the inability of an agent to access necessary information. The inability to access such information results in delays and inefficiencies. Another problem with present interfaces is the display of unnecessary information which is distracting to an agent. Once again, valuable time is lost to an agent by sifting through unnecessary information.

When creating known interfaces for agents, programmers had to reply on the past positions of data elements and previous interpretations of where information and transactions were placed on the screen space. Since such placement was a byproduct of computer legacy systems which were designed as static display applications, relying on previous placement of data and information does not result in function conveyance of necessary information to a call center agent. Further, since traditional information was largely static, additional resources would have to be accessed up by a call center agent. This further decreases efficiency and requires further training.

BRIEF DESCRIPTION OF DRAWINGS

FIG. 4 is a screen shot of an example consumer service report window accessible via the user interface of FIG. 3.

FIG. 5 is a screen shot of an example notes window accessible via the user interface of FIG. 3.

FIG. 7 is a screen shot of the example main screen which is accessible via the communicate section of the example user interface of FIG. 3.

FIGS. 10A & 10B are screen shots of a sequence of example consumer offering windows displaying the action section of the example user interface shown in FIG. 8.

DETAILED DESCRIPTION

In general, the example call center user interface methods and apparatus described herein enable a user interface for a call center representative work station. The workstation is usable by a call center representative to respond to a customer inquiry. The user interface screen has a passive focus screen area to display at least one of customer data and a reason for the customer inquiry to the call center. An active communicate screen area displays a script of dialog text relating to the customer inquiry. An active actions screen area displays information to launch an action to facilitate a response to the customer inquiry. A passive support screen area displays information relating to actions available to the call center representative in the active communicate and actions screen areas.

Figure 1:
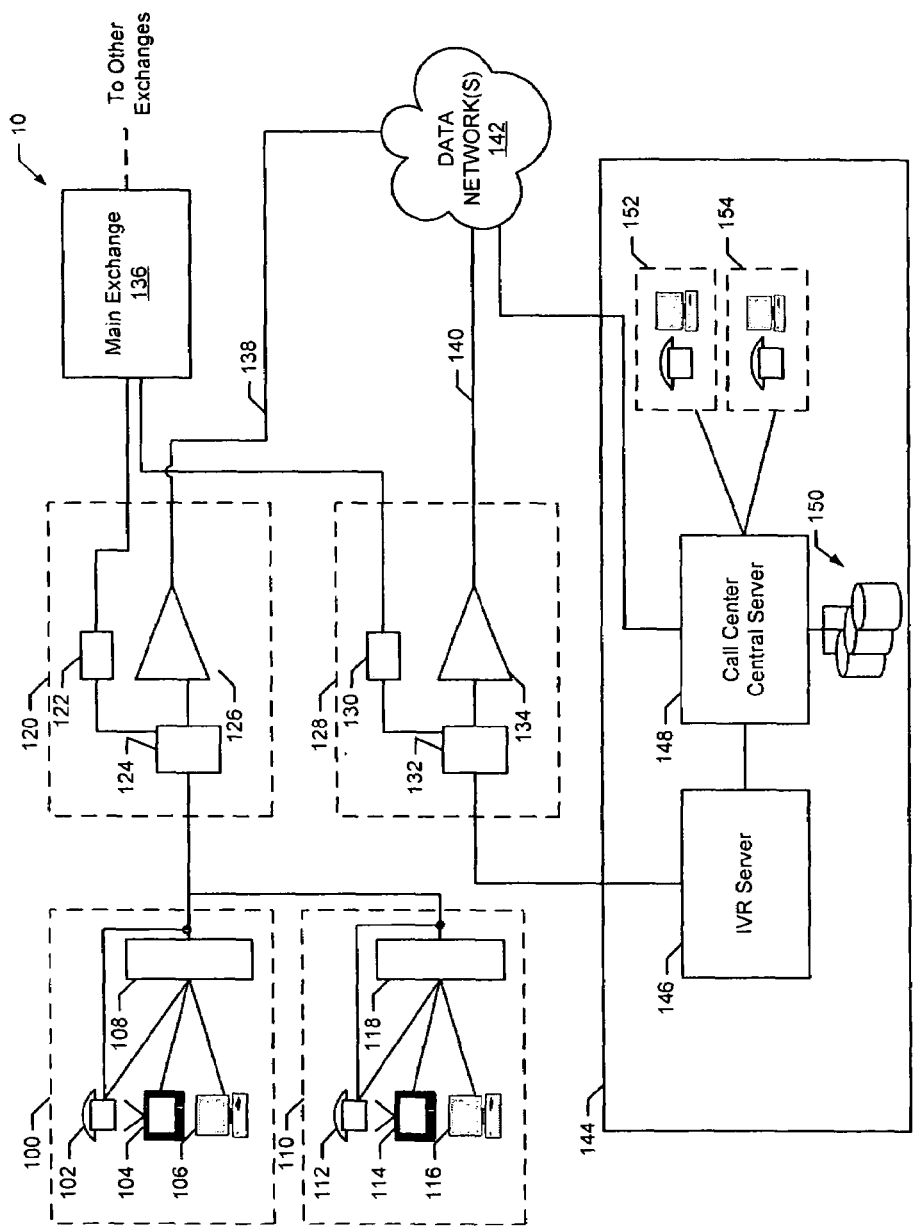
FIG. 1 is a block diagram of an example telecommunications system with an example call center which may use an interface for an agent.

FIG. 1 is a block diagram of an example telecommunications system 10 that may use an example call center user interface to handle customer support requests and may facilitate the same by, for example, predicting the reason that a person is calling a call center. The example telecommunications system 10 includes a first consumer location 100, a second consumer location 110, a first central office 120, a second central office 128, a main exchange 136, a first communication line 138, a second communication line 140, one or more data network(s) 142, and a call center 144.

In general, the call center 144 is a location for handling customer support requests. The call center 144 may be associated with a particular business or may handle customer support requests for a variety of businesses. The customer support requests may relate to products and/or services purchased from the business or businesses. When customers contact the call center 144 (using voice or data communications), the devices and agents of the call center receive information and requests from the customers and respond to answer the customers' requests. For example, if a business provides telephone related services and/or products such as telephone services, mobile services, DSL Internet service etc., a customer may call the call center 144 to address issues relating to their services and/or products. The devices and agents of the call center 144, as explained below with reference to FIG. 3, will work with the customer to resolve the requests and any other issues.

The first consumer location 100 and the second consumer location 110 are two examples of the many consumer locations that may exist in a telecommunications system. The first consumer location includes a telephone 102 and customer premise equipment (CPE) 108. Likewise, the second consumer location 110 includes a telephone 112 and customer premise equipment (CPE) 118.

The telephones 102 and 112 are devices for allowing voice communication between two or more parties. As illustrated, the telephones 102 and 112 may be analog phones communicating over a plain old telephone service (POTS) network (illustrated as the line connecting the telephone to the right side of the CPEs 108 and 118) or may be digital phones communicating over a digital communications network (e.g., Voice Over Internet Protocol (VOIP)) (illustrated as the line connecting the telephone to the left side of the CPEs 108 and 118). The telephones 102 and 112 may be any voice communication device. For example, the telephones 102 and 112 may be wireless telephones, cellular telephones, walkie-talkies, etc.

The CPEs 108 and 118 are devices for providing communications between the first and/or second consumer locations 100 and 110 and either or both of the central offices 120 and 128, respectively. The CPEs 108 and 118 are capable of communicating with the telephones 102 and 112. In other words, the CPEs 108 and 118 handle bidirectional communication between the consumer locations 100 and 110 and the central offices 120 and 128. The examples CPEs 108 and 118 include components for handling the communication needs of each of the devices at their perspective consumer locations 100 and 110. For example, the CPEs 108 and 118 may include components for handling VOIP communication, IP television communication, and/or digital subscriber line (DSL) communication. Of course, the CPEs 108 and 118 may additionally include any other components such as, for example, components for cable Internet, cable television, satellite television, satellite Internet access, OTA television broadcasts, etc. Further, while the CPEs 108 and 118 are illustrated as a single device, persons of ordinary skill in the art will recognize that the functionality of the CPEs 108 and 118 may provided by two or more devices. For example, the CPEs 108 and 118 may be replaced by or may include one or more of a cable Internet modem, an asymmetric digital subscriber line (ADSL) terminal unit—remote (ATU-R, commonly referred to as a DSL modem), a very high bit rate DSL (VDSL) transceiver unit, a synchronous DSL (SDSL) transceiver unit, a high bit rate DSL (HDSL) transceiver unit, a fiber-optic communication transceiver, an integrated services digital network (ISDN) transceiver unit, a multirate symmetric DSL (MDSL) transceiver unit, a rate adaptive DSL (RADSL) transceiver unit, a voice-over DSL (VoDSL) transceiver unit, a satellite data transceiver unit, a POTS modem, a set top box (STB), a residential gateway (RG), a VOIP phone adapter, etc. In addition, the CPEs 108 and 118 may include and/or be coupled with a hub, a switch, and/or a router to allow multiple devices to be connected to the device simultaneously.

The first central office 120 and second central office 128 provide communication between a plurality of consumer locations and one or more service provider networks. For example, the first central office 120 provides communication between the first consumer location 100 and/or the second consumer location 110 and the main exchange 136 and the one or more data network(s) 142. The first and second central offices 120 and 128 include POTS splitters 124 and 130, POTS switches 124 and 132, and DSL access multiplexers (DSLAM) 126 and 134.

The POTS splitters 122 and 130 separate POTS communications from data communications (e.g., DSL communications). The POTS communications are forwarded to the POTS switches 124 and 132. The data communications are forwarded to the DSLAMs 126 and 134. Persons of ordinary skill in the art will recognize that the POTS splitters 122 and 130 may provide additional or alternative splitting functionality depending on the communication protocols and devices present in the telecommunications system. Further, if a single communications protocol or compatible communications protocols are present, the POTS splitter may not be necessary.

The POTS switches 124 and 132 handle POTS communications from the plurality of consumer locations connected to the central offices 120 and 128. If a call from telephone 102 is received via POTS communications, the POTS switch 124 determines whether the call should be routed to another telephone connected to the first central office 120 or should be routed to a higher level exchange (e.g., main exchange 136) to reach another central office (e.g., second central office 128).

The DSLAMs 126 and 134 are capable of handling data communications between the first and second central offices 120 and 128 and the first and second consumer locations 100 and 110 and the call center 144. The DSLAMs 126 and 134 are capable of handling data communications with multiple CPEs (e.g., CPEs 108 and 118). The DSLAMs 126 and 134 route communications from the first and second consumer locations 100 and 110 to the one or more data network(s) 142 over asynchronous transfer mode (ATM) communication links 138 and 140 or any other communication links. Persons of ordinary skill in the art will recognize that while DSLAMs for communication with CPEs having DSL capabilities are shown, any device that is capable of handling data communications with a consumer location may be used. For example, devices for handling cable communications, fiber optic communications, or dial-up data communications may be used.

The main exchange 136 connects to the first and second central offices 120 and 128 and other national and international exchanges. The main exchange 136 routes calls between the first and second central offices 120 and 128. For example, a call from telephone 102 may be sent using POTS communications from the telephone 102 to the central office 120. The central office 120 then routes the call to the main exchange 136. If the call is directed to the call center 144, the main exchange routes the call to the second central office 128. The second central office 128 routes the call to the call center 144 using the POTS switch 132. Alternatively, if the call was directed to an international location, the main exchange 136 routes the call to an international exchange.

The one or more data network(s) 142 may be data networks associated with a service provider or external to the service provider. For example, the one or more data network(s) 142 may comprise a first network of customers and equipment connected to the service provider and a second network that is external to the service provider (e.g., the Internet). While the one or more data network(s) 142 of FIG. 1 are illustrated as a single unit connected to multiple data capable devices, persons of ordinary skill in the art will recognize that numerous network topologies may be used. For example, a first network may be connected to a first subset of data capable devices while a second network may be connected to a second, but not necessarily mutually exclusive, subset of data capable devices. In addition, separate communication links may be used to connect to a first data network and a second data network. While ATM communication links 138 and 140 are shown connecting the DSLAMs 126 and 134 to the data networks 142, any communication links capable of transmitting data between devices may be used such as, for example, an Ethernet connection with virtual private LAN service (VPLS), a frame-relay connection, any Layer 2 communication protocol, or any other communication protocol.

In the illustrated example, the call center 144 is a location where one or more call center agents receive customer calls (e.g., voice communication) or messages (e.g., data communication), both of which are referred to herein as contacts. For example, a call center may handle technical support calls for customers of a telecommunications provider. In another example, the call center may handle calls from customers who purchased a product from the company that is associated with the call center. In another example, the call center may be a general call center that is hired by a company to receive support calls from the company's customers or users. The example call center 144 includes an interactive voice response (IVR) server 146, a call center central server (CCCS) 148, one or more databases 150, a first terminal 152, and a second terminal 154. The first terminal 152 and second terminal 154 are workstations in the illustrated example for agents at the call center 144.

The IVR server 146 receives incoming call center calls from the second central office 128. The IVR server 146 handles initial interaction with the callers. For example, the IVR server 146 may play a pre-recorded message when a call is initially received. The IVR server 146 may then request that the caller speak or enter using the telephone keypad an identifier for the caller. For example, the caller may enter an account number, a phone number, a product/serial identification, and/or a social security number. Based on the identifier and other information (e.g. queue lengths, personnel available etc.), the IVR server 146 may additionally route the call to the CCCS 148 or one of the first and second terminals 152 and 154. In addition, the IVR server 146 may interact with the CCCS 148 to further handle the call. For example, the IVR server 146 may pass the identifier received from the caller to the CCCS 148 and await further instructions. In other words, the IVR server 146 provides the functionality of receiving phone calls and interacting with the caller using pre-recorded and computer generated messages. Persons of ordinary skill in the art will recognize that the IVR server 146 may receive calls using POTS communications, VOIP communications, or any other communication method.

The CCCS 148 is capable of receiving data and communications associated with customer contacts and replying to and/or routing the customer contacts. Data associated with POTS or VOIP communications may be received from the IVR server 146. In addition, VOIP communications, instant message communications, webpage communications, communications from CPEs 108 and 118, and any other type of data-based communication may be received from the one or more data network(s) 142. The CCCS 148 receives identifiers to identify the customer initiating the contact, requests for support from the customers, and handles interactive communication with the customers. For example, a contact including an identifier and a support question may be received by the CCCS 148. The CCCS 148 uses available resources to generate a response to the support question and communicates the response to the customer (possibly using the IVR server 146 in the case of voice communications).

The CCCS 148 is connected to one or more data sources 150. The one or more data sources 150 may be any available data source such as, for example, a database of customer records, a database of equipment inventory, a database of business rules, a database of accounting records, a data source providing information about the status of network equipment, a database containing customer contact historical data, a database containing product purchase history, etc. The CCCS 148 in the illustrated example retrieves data from the one or more data sources 150 to handle customer contacts. For example, when an identifier for a customer is received, the CCCS 148 may query one or more of the one or more data sources 150 to obtain information about the customer. In addition, the CCCS 148 may obtain business rules from one or more of the one or more data sources 150. The business rules and the data associated with the customer obtained from the one or more data sources 150 may be used to provide support to the customer as will be explained below. The CCCS 148 is described in further detail in conjunction with FIG. 2.

The first terminal 152 and the second terminal 154 each include a telephone and a computer at which a call center agent is stationed. When the CCCS 148 determines that a contact requires support from a call center agent, the CCCS 148 routes the call to a terminal (e.g., 152 and/or 154) that is not currently handling a call and/or places the call on hold in a queue of calls awaiting service. For example, the CCCS 148 may receive information from the caller and, in response, present information to the caller to fulfill the reason that the caller is calling. If the CCCS 148 cannot fulfill the reason for the caller's call, the CCCS 148 will route the call to either the first terminal 152 or the second terminal 154 depending on the availability of each. Of course, while two terminals are illustrated in FIG. 1, any number of terminals may be present at a call center. In addition, while the example terminals are illustrated as comprising a telephone and a computer, any desired configuration may be used. For example, each terminal may include an integrated telephone and computer or may not include a telephone if all contacts are to be handled via the computer.

For ease of illustration, FIG. 1 is a simplified version of a telecommunications system. Persons of ordinary skill in the art will recognize that an actual telecommunications system may include other components not illustrated in FIG. 1. In addition, an actual telecommunications system will likely include many more consumer locations, central offices, and exchanges. Further, the connections of equipment illustrated in FIG. 1 are not intended to be exhaustive or exclusive. For example, the first and second terminals 152 and 154 may be connected to the IVR server 146 and/or may be connected to another server which interposes between the CCCS 148 and/or the first and second terminals 152 and 154.

Figure 2:
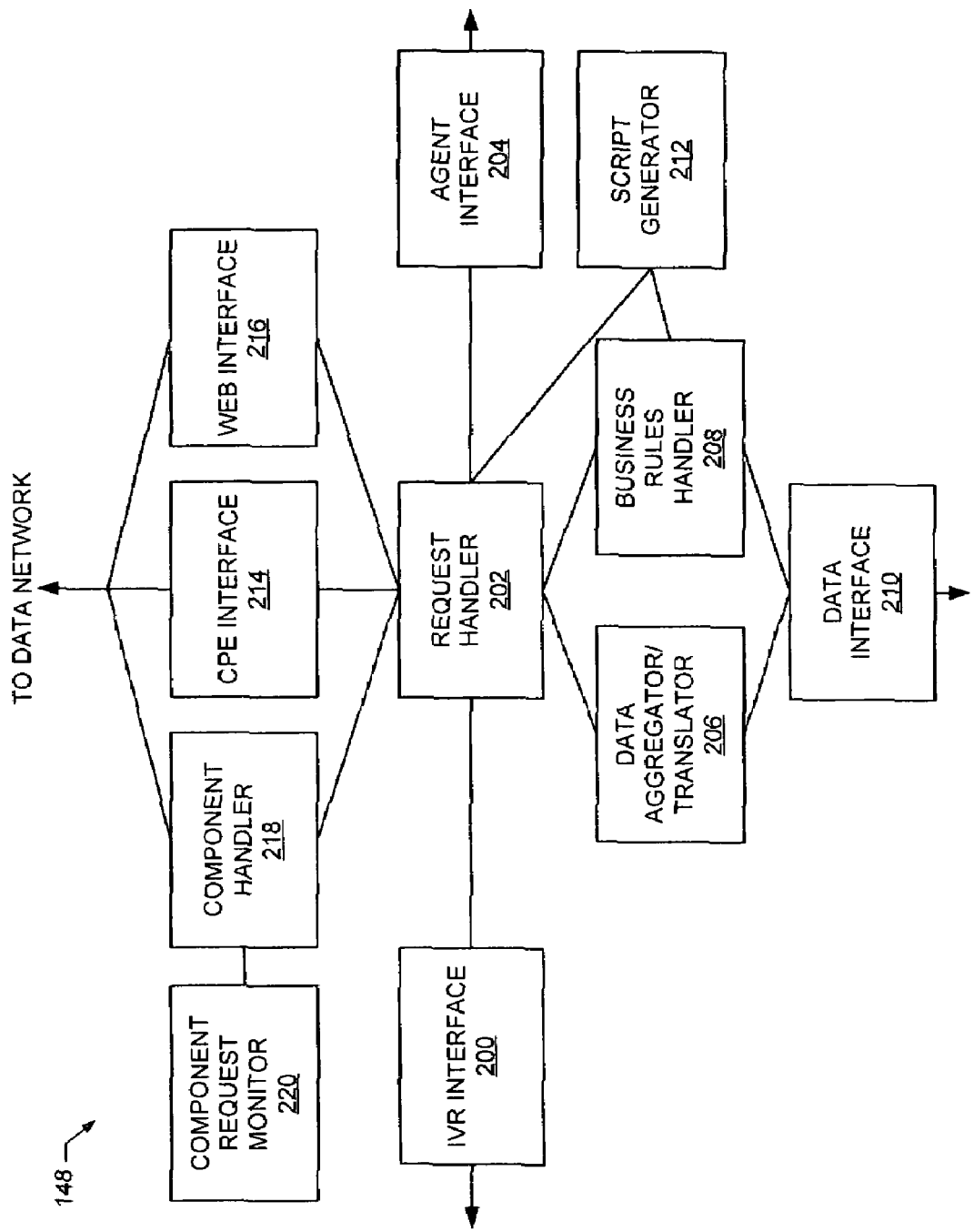
FIG. 2 is a block diagram of an example implementation of the call center central server of FIG. 1.

FIG. 2 is a block diagram illustrative of an example implementation of the CCCS 148 of FIG. 1. The example CCCS 148 includes an IVR interface 200, a request handler 202, an agent interface 204, a data aggregator/translation 206, a business rule handler 208, a data interface 210, a script generator 212, a CPE interface 214, a web interface 216, a component handler 218, and a component request monitor 220.

In general, the CCCS 148 receives contact requests via the IVR interface 200, the CPE interface 214, and/or the web interface 216. The request handler 202 is responsive to such requests, retrieving data from the available data sources to respond to the request associated with the contact. The CCCS 148 interacts with the contact via the IVR interface 200, the CPE interface 214, and/or the web interface 216. If the CCCS 148 determines that the contact requires assistance from a call center agent, the CCCS 148 routes the call to an available agent terminal via the agent interface 204. The components of the CCCS 148 will now be described in further detail.

The example IVR interface 200 interfaces with an IVR server such as, for example, IVR server 146 of FIG. 1. The IVR interface 200 receives information associated with contacts from the IVR server. The IVR interface 200 also transmits information for the contacts to the IVR server. For example, when a customer contacts the call center they may give their account number to the IVR server. The IVR server transmits the account number to the IVR interface 200. The CCCS 148 then generates a response to the customer contact and transmits the response to the IVR interface 200.

If the response is in the form of text, the IVR interface 200 converts the text to speech and presents the speech to the user. If the response is in the form of speech, the IVR interface 200 presents the speech to the customer. In the illustrated example, the IVR interface 200 includes the ability to authenticate customer callers by accessing the IVR server 146. In addition, the IVR interface 200 may interface with two or more IVR servers, if available.

The request handler 202 of the illustrated example receives information associated with a contact from the IVR interface 200, the CPE interface 214, and the web interface 216. In addition, the request handler 202 also receives information associated with the contact from the agent interface 204. In response to such information, the request handler 202 may request further data from the data aggregator/translator 206, the business rules handler 208, and the component handler 218. Using the information associated with the contact and any retrieved data, the request handler 202 generates one or more responses to the contact. The response may be in the form of text or speech messages sent to the IVR interface 200, the CPE interface 214, the web interface 216, and/or the agent interface 204. The response may also be in the form of a script transmitted to the agent interface 204 that an agent can read or write to a contact as will be explained below.

The agent interface 204 in the illustrated example communicates with one or more agent terminals such as, for example, the first and second agent terminals 152 and 154 of FIG. 1. The agent interface 204 receives information associated with a contact that is entered by an agent at a terminal and displays the information on the screen interface which will be explained below. The agent interface 204 transmits responses generated by the request handler 202 to the agent terminals.

The data aggregator/translator 206 of the illustrated example receives data from the data interface 210, combines the data (e.g., combines data from a first data source and a second data source), and converts it to be useful to the request handler 202. In particular, the data aggregator/translator 206 may receive data that has been retrieved from multiple databases and combine the data into a single data set. For example, the data aggregator/translator 206 may request that the data interface 210 retrieve all data associated with a particular customer account number from an accounting database, an inventory database, and a contact information database. The data aggregator/translator 206 will then combine the data retrieved from each of the databases into a single set of data. Further, if all of the retrieved datasets are not in the same format or the format is not readable by the request handler 202, the data aggregator/translator 206 will convert the datasets to a single-supported format. This translation may include converting to a binary format, a text format, a particular data layout, an ordering of the data retrieved, etc. Persons of ordinary skill in the art will recognize that, if desired, the data aggregator/translator 206 may combine the data to form more than one dataset.

The business rules handler 208 of the illustrated example receives business rules from the data interface 210. The business rules are stored in one or more data sources such as, for example, data sources 150 of FIG. 1. The nature of the business rules varies according to the purpose of the call center and the business or businesses that are associated with the call center. In general, the business rules comprise instructions for handling requests for support which are communicated to the agent via the interface explained below in FIG. 3. The business rules handler 208 is capable of storing the business rules retrieved from the databases via the data interface 210 and is also capable of transmitting the business rules to the request handler 202 and the script generator 212. The business rules handler 208 may include a user interface for creating, deleting, and modifying business rules.

The data interface 210 of the illustrated example connects to a plurality of data sources such as, for example, data sources 150 of FIG. 1. The data sources may be any available data source including, but not limited to, a file, a database, a stream of data, a hard drive storage unit, a volatile memory storage unit, and/or a person at a computer terminal. The data interface 210 includes the functionality to connect to any desired data source. The data interface 210 transmits data retrieved from the data sources to the data aggregator/translator 206 and transmits business rules to the business rules handler 208. The data interface 210 is also capable of writing data to the data sources if desired.

The script generator 212 of the illustrated example uses data received from the request handler 202 and the business rules handler 208 to generate scripts for agents of the call center. As will be explained below, the script is a detailed description of how the agent is to handle the contact depending on other data received from the client which is displayed on the user interface configuration.

The CPE interface 214 of the illustrated example communicates with CPEs over a data network located at consumer locations such as, for example, CPEs 108 and 118 of FIG. 1. More specifically, the CPE interface 214 receives contacts made through CPEs. For example, a customer may experience difficulty changing channels on a television and may press a button on their remote control to send a request for support to the call center. The request is received by the CPE interface 214. In addition, the customer may enter and/or the CPE may automatically send data associated with the customer and/or the CPE to the CPE interface 214. The CPE interface 214 transmits the request and associated data to the request handler 202. When a response to the request is generated, the response is sent via the CPE interface 214. The CPE interface 214 may comprises an open port, socket, or interface for the request handler 202 or may be a data server capable of transmitting a user interface to CPEs.

The web interface 216 of the illustrated example communicates over a data network to allow customers to contact the call center 144 using a web browser. The data network may be a private network or a public network (e.g., the Internet). The web interface 216 may receive data from one or more associated web servers or may be a web server itself. Similar to the CPE interface 214, the web interface 216 passes requests and associated data to the request handler 202 and transmits responses to the one or more associated web servers or to a connected web browser. The web interface 216 may allow for communication via live chat messages, via a forum for posting messages, via email messages, via a static webpage, etc. The web interface 216 allows customers to interact with the CCCS 148 without the need to speak to an agent. However, if the web interface 216 determines that the customer's request requires interaction with an agent, the web interface 216 can instruct the customer to contact an agent using a telephone or can direct the client to text or voice chat via the data network.

The component handler 218 of the illustrated example communicates with network components to determine if any of the components (e.g., DSLAMS, network routers, network switches, servers, optical line terminals, etc.) are experiencing one or more problems. The component handler 218 may use any available connection to communicate with the network components, including a public network, a private network, or direct (e.g. dedicated) connections to the devices. The component handler 218 may connect using a secure connection such as a virtual private network (VPN) connection. For example, the component handler 218 may establish a VPN connection over a public network to a DSLAM at a central office (e.g., the DSLAM 126 of FIG. 1). The component handler 218 may request the DSLAM to provide information about its current state of operation. Based on the information about the state of operation of the DSLAM, the component handler 218 can determine if the DSLAM is operating properly. If, for example, the DSLAM indicates that it is not accepting external connections from consumer locations, the component handler 218 may determine that the component is not functioning properly. If the component handler 218 determines that a component is not functioning properly, the component handler 218 informs the request handler 202.

The component request monitor 220 in the illustrated example assists the component handler 218 in determining whether a component may have a problem. The component request monitor 220 stores information about customer contacts (i.e., service calls made by customers). In particular, the component request monitor 220 identifies the components relating to each customer's contact. Accordingly, the component request monitor 220 can track the number of customer contacts that are associated with each of the components. Based on the number of customer contacts associated with a component, the component request monitor 220 may determine that a component has a problem, or that a component should be examined to determine if it has a problem. For example, if the number of customer contacts associated with a given component exceeds a threshold, the component request monitor 220 indicates that the device may have a problem and notify support personnel that they should check the component. The component request monitor 220 may use any available information to identify the components with which a particular customer contact is associated. For example, the component request monitor 220 may receive a list of components that are associated with a customer contact from the request handler 202, which has obtained the list from an inventory database via the data aggregator/translator 206 and the data interface 210.

Figure 3:
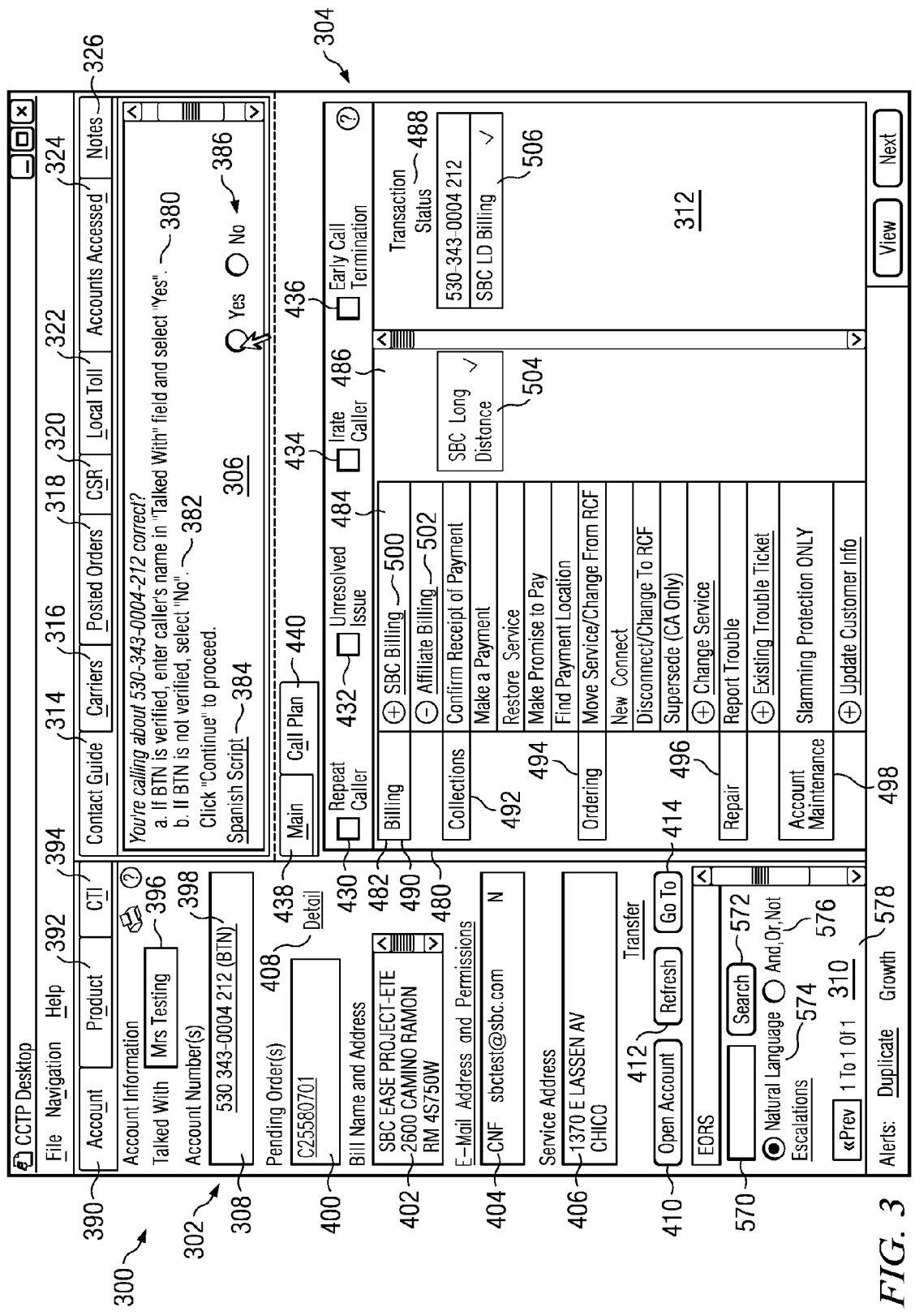
FIG. 3 is a screen shot of an example call center user interface.

FIG. 3 is a screen shot of an example of a user interface 300 generated by the example agent interface 204 and displayed on one or both of the terminals 152 and 154 (e.g. call center agent workstations). In the illustrated example, the terminals 152 and 154 are computers having integrated hardware configurations. Specifically, the terminals 152 and 154 have a headset with a speaker and microphone for verbal communication by the agent and a keyboard and a mouse for screen image manipulation by the agent. Of course, those of ordinary skill in the art will appreciate that other verbal inputs such as external speakers and microphones may be used. Also, additional input devices such as track balls, touch pads, touch screens, scanners and the like may be used for screen image manipulation. In this example, the terminals 152 and 154 are combinations of computers and telephony equipment. Telephony functions are thus controlled via software on the user interface. Such functions may include, for example, an in button, one or more dial line buttons, a transfer button, a conferencing button, an open line button and a release button. The user interface 300 is used by a call center agent to respond to a customer inquiry or request via the telephone or other communications medium. In the illustrated example, the user interface 300 is divided into a passive screen area 302 on one side of the user interface 300 which includes information and actions which do not require agent action and an active screen area 304 on the opposite site of the user interface 300 which includes information and actions which require agent action.

The passive screen area 302 and the active screen area 304 allow an orderly and efficient display of information needed by the agent for interaction with a customer who calls with an inquiry and is routed to the call center 144. The passive screen area 302 and the active screen area 304 are subdivided into four sections including a communicate section 306, a focus section 308, a support section 310 and an action section 312. The focus section 308 and the support section 310 are passive screen areas located in the passive area 302 to the side of the communicate section 306 and the action section 312. The communicate section 306 and the action section 312 are active screen areas and in the active area 302.

The illustrated example arrangement of the passive and active areas 302 and 304 allows information to be repeatedly displayed logically in the consistent location, for ease of use by the call center agent. By categorizing necessary data and links to actions, repetitive information is eliminated and efficiency is enhanced. The illustrated example user interface 300 in FIG. 3 allows future enhancements to be added easily and allows for rapid adaptability to such new features as they are added via alterations to the agent interface 204 or any other appropriate modules in FIG. 2. The four sections 306-312 may have a series of tabs which allow different data and links to be displayed on the user interface 300.

In the illustrated example, the communicate section 306 is an active screen area to display a script including dialog text relating to the customer inquiry. In the illustrated example, the user interface 300 is designed for a call center for a business offering telephone related products and/or services. In the illustrated example, the communicate section 306 has a contact guide tab 314, a carriers tab 316, a posted orders tab 318, a customer service reports (CSR) tab 320, a local toll tab 322, an accounts accessed tab 324 and a notes tab 326. Those of ordinary skill in the art will appreciate that other tabs and/or categories may be listed for the same or other types of services or product sales, or for other purposes for which the call center may be designed. The carriers tab 316 brings up a window showing information on the current carrier who provides telephone and other services to the customer. The posted orders tab 318 calls a window showing the status of any pending orders on behalf of the customer. The customer service reports (CSR) tab 320 brings up a window in the communicate section 306 showing the customer's service record (shown in FIG. 4). The local toll tab 322 brings up a window showing definitions of the particulars of the service to the customer such as usage, minutes, calls allowed etc. The accounts tab 324 brings up a window showing the history of calls made by the customer for the day. As will be explained with reference to FIG. 5, the notes tab 326 brings up a window in the communicate section 306 allowing entry of notes concerning the customer as well as records of actions taken on the customer's account.

Figure 4:
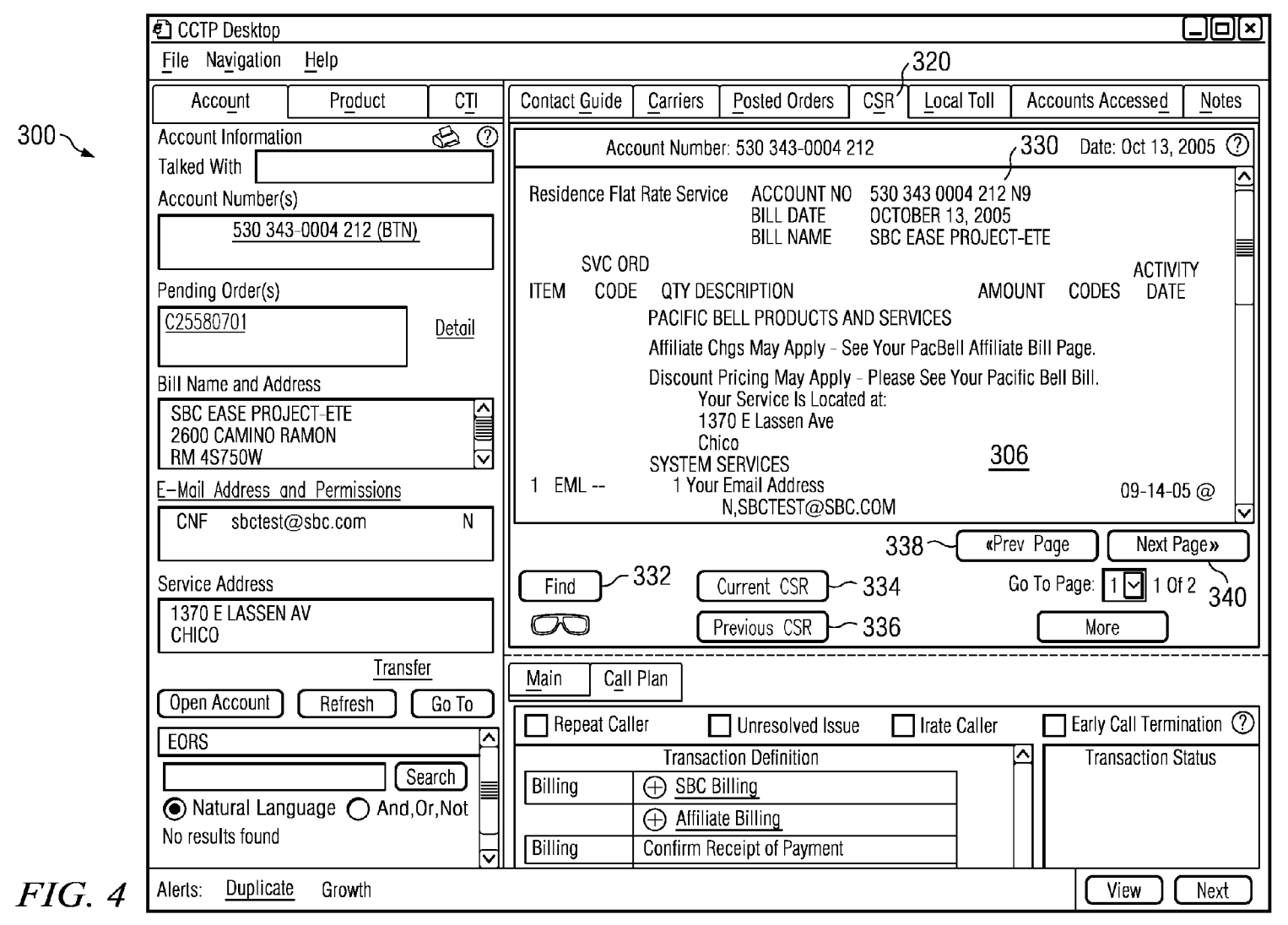

FIG. 4 shows an example customer service record window 330 which is displayed by selecting the CSR tab 320 in FIG. 3. In the illustrated example, the customer service record window 330 is presented in the communicate section 306 and shows data relating to the services and products of the customer whose data and information is shown in the user interface 300. The customer service record window 330 has a find button 332, a current CSR button 334, a previous CSR button 336, a previous page button 338 and a next page button 340. The find button 332 enables an agent to search for text or terms on the currently displayed CSR. The current CSR button 334 and the previous CSR button 336 allow an agent to access customer records for different months. The previous page and next page buttons 338 and 340 allow an agent to navigate through the different pages of the customer record. The agent interface 204 responds to selection of these buttons by accessing the appropriate software to retrieve and display the requested data.

FIG. 5 shows a notes window 350 of the illustrated example which is displayed in the communicate section 306 when the notes tab 326 is selected in the user interface 300. The notes window 350 has a notation area 352 which has row entries 354 showing the actions made by the agent or other agents on behalf of the customer as defined in the action section 312. The row entries 354 include the date and time of the action, the responsible party on behalf of the customer, a description of the action, the user who recorded the entry and the type of the entry. Additional notes may be made via a notation box 356. The notes window 350 has a navigation area 358 with additional action buttons including an add note button 360, a quick note button 362, a clear button 364, a more button 366 and a find button 368. The add note button 360 allows the agent to add the finished note from the notation box 356 to the row entries 354. The quick note button 362 allows the display of standard notation for selection of standard actions to the row entries 354. The find button 366 allows an agent to search for a specific text or term in the notation area 352. The more button 368 allows for the addition of more lines of notes. The agent interface 204 responds to selection of these buttons by accessing the appropriate software to retrieve and display the requested data.

In the illustrated example, the navigation area 358 has additional links including a view collection notes link 370 which activates a pop up window showing the collection efforts for the customer. An add follow up note link 372 activates a pop up window to add a follow up action note to the customer record. As will be explained with reference to the action section 312, notes are automatically added to the customer record displayed in the row entries 354 when certain actions are taken by the agent.

Returning to FIG. 3, the contact guide tab 314 is selected and as shown the communicate section 306 displays a script 380 to facilitate and/or direct interaction with the customer. In the illustrated example, the suggested script 380 to be read to the customer are presented in a style (e.g. italics) that is different from portions that are informational and not read aloud as shown in FIG. 3. Mandatory verbiage is displayed in bold font. An instruction text 382 is provided in plain text under the spoken script 380. The instruction text 382 relates to an explanation or instruction regarding the spoken script 380. Persons of ordinary skill in the art will appreciate that there are other ways to differentiate the script 380 from the instruction text 382 such as different fonts, colors, sizes etc. In addition the instruction text 382 may be located in other positions relative the spoken script 380 including but not limited to above or to the side of the spoken script 380. The instruction text 382 may include a reference to the other sections such as the support section 310, the action section 312 or any of the associated tabs of these sections. An optional language link 384 is provided to display the script in other languages. A continue button 386 is provided to advance the script to the next scripting panel by displaying additional script as the dialog by the agent continues with a customer. The script 380 is dialog text which is read to the customer by the agent. The script 380 and subsequent sequences are determined by the caller data and the reason for the caller inquiry to the call center 144 in FIG. 1 as reflected by the data in the focus section 308 and are displayed by accessing the script generator 212 and the business rules handler 208 in FIG. 2.

In the illustrated example, the focus section 308 is a passive screen area to display data relating to the customer and the reason for the customer inquiry to the call center. The focus section 308 displays information related to the customer for use by the call center agent. This data is obtained via the data interface 210 and may be accessed from any source(s) including the IVR server 146 the IVR interface 200 and/or the databases 150 in FIGS. 1-2. The tabs in the focus section 308 include an account tab 390, a product tab 392, and a computer telephony integration (CTI) tab 392. As will be explained in reference to FIG. 6, the product tab 392 brings up a screen in the focus section 308 showing data relating to a particular product or products. The CTI tab 394 brings up a screen which displays information about the call that is passed from the IVR server 146 obtained from the customer.

The account tab 390 brings up data relating to the customer account as is shown in FIG. 3. In the illustrated example, such data includes caller identification data, the reason for the call and/or contact information although other types of caller account data may additionally or alternatively be displayed. In this example, the account tab 390 is selected in FIG. 3 and the focus section 308 thus includes a talked with field 396, an account numbers field 398, a pending order numbers field 400, a billing contact field 402, an e-mail field 404 and a service address field 406. The talked with field 396 is a text field which allows an agent to enter the name of the individual customer being talked to. The account numbers field 398 lists the account number or numbers assigned to the customer as shown in FIG. 3. The pending order field 400 lists all pending work orders associated with the customer. The details of the pending order may be displayed in a pop-up window by selecting a details link 408. Customer contact information is displayed in the billing contact field 402, the e-mail field 404 and the address field 406. The data in the fields 396-406 may be obtained from the caller records stored in the databases 150 accessed and sorted by the data aggregator 206 and the data interface 210 in FIG. 2. In this example, these fields are pre-populated for the agent to obtain information relating to the customer and the reason for the customer call.

In addition, the data in these fields may be updated by the agent in accordance with the script 380 and/or instructional text 382 displayed in the communicate section 306. Of course those of ordinary skill in the art will appreciate that other fields may be displayed in the focus section 308 to, for example, reflect the identification of the caller and the reasons for the call. If the script 380 and/or the instructional text 382 requires modification of accounts, a number of action buttons may be selected. In the illustrated example, these action buttons include an open account button 410, a refresh button 412 and a go to button 414. The open account button 412 causes a pop up window to appear to allow an agent to open a new account and display the details of that account in the focus section 308. The refresh button 412 causes the information in the focus section 308 to be redisplayed with any updates to the information made. The go to button 414 allows a user to give links to other reference sources and applications other than the databases 150. These may include webpages on the Internet or a company Intranet, other programs or data sources.

Figure 6:
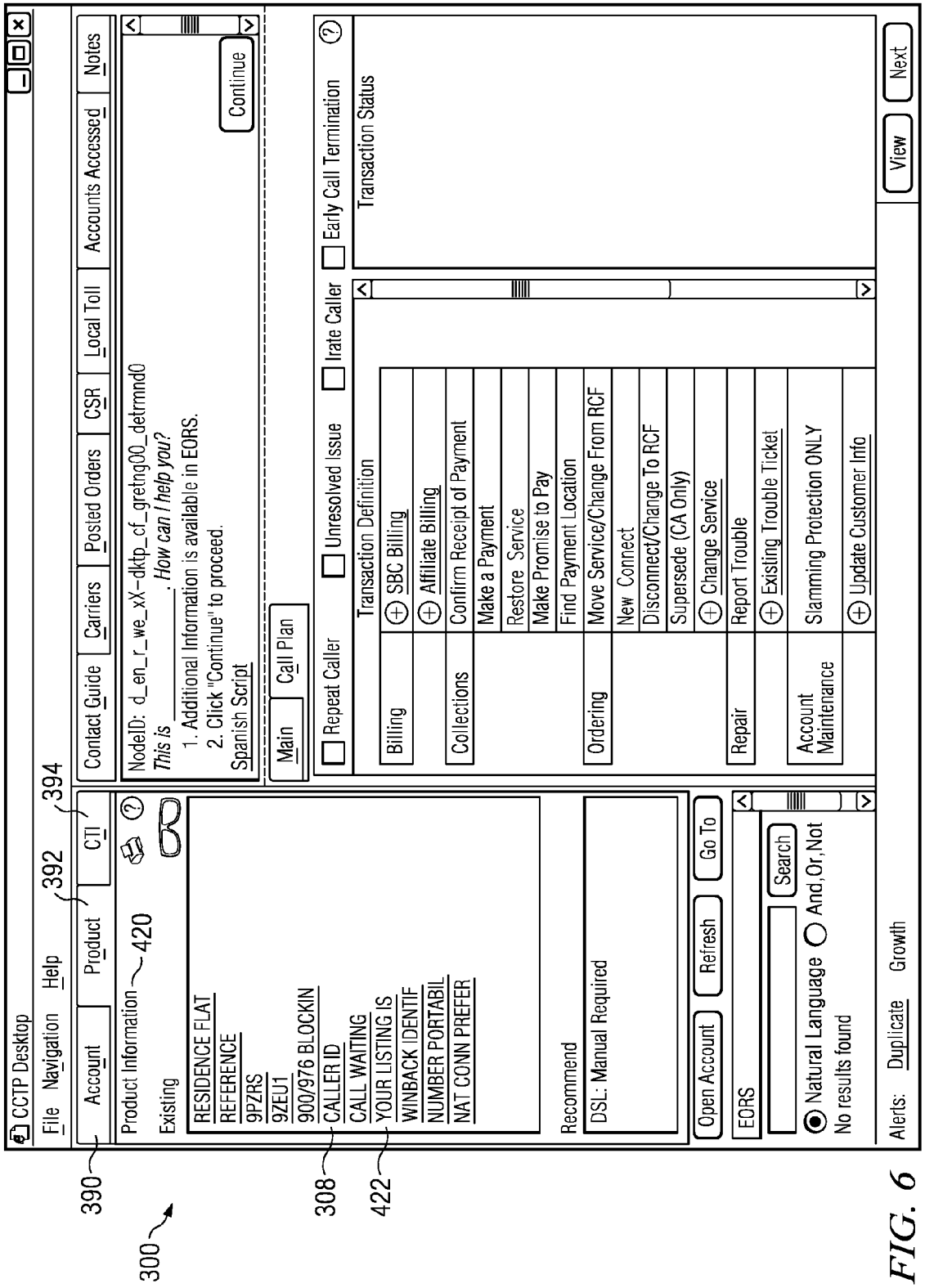
FIG. 6 is a screen shot of the product screen which is accessible via the focus section of the example user interface of FIG. 3.

In the illustrated example, the product tab 392 is selected to enable a product information window 420 displayed in the focus section 308 as shown in FIG. 6. The product information window 420 shows a product list 422 containing the names of products and/or services the customer already subscribes to. English translation of internal coding is displayed when available. An agent may display information on a particular product by clicking on the name of the product in the product list 422 which will result in a pop-up window showing information regarding the product such as ordering data, price, coding or product descriptions. A recommend area 424 also is displayed which shows product and service names which may be useful to the customer, but are not presently owned, licensed and/or subscribed to by the customer. The product names serve as links to pop-up windows showing information regarding the product and/or service such as ordering data, price, coding or product descriptions.

Returning to FIG. 3, the action section 312 is an active screen area which enables the execution of various actions related to customer requests communicated to the call center agent. The action section 312 may contain links and/or other controls to activate necessary apparatus and/or programs to execute various actions. The actions launched from the action section 312 may also communicate with the script generator 212, business rules handler 208 and/or the data aggregator 206 in FIG. 2 to change the information shown in the other sections 306-310. The actions may also launch applications in the other sections 306-310. For example, an agent interaction in the action section 312 may cause a script to be generated in the communicate section 306 which explains the action taken to the agent and provides dialog text to be communicated to the customer by the agent as well as information to support those actions and explanations in the support area 310. The action section 312 in the illustrated example has a variety of options which may be selected by the agent reflecting the customer call. These options include a repeat caller check box 430, an unresolved issue check box 432, an irate caller check box 434 and an early call termination check box 436. Marking one of the check boxes 432-436 will make a notation of this information in the notes window 350 in FIG. 5 for later reference by the agent and/or other agents who may have additional contact with the customer. The action section 312 of the illustrated example has a main tab 438 and other tabs which deal with specific sets of actions such as a call plan tab 440. Those of ordinary skill in the art will understand that the illustrated example relates to phone services and application of these principles to other services and/or products can have any variety of customer service actions and corresponding tabs for windows related to these actions.

Figure 7:
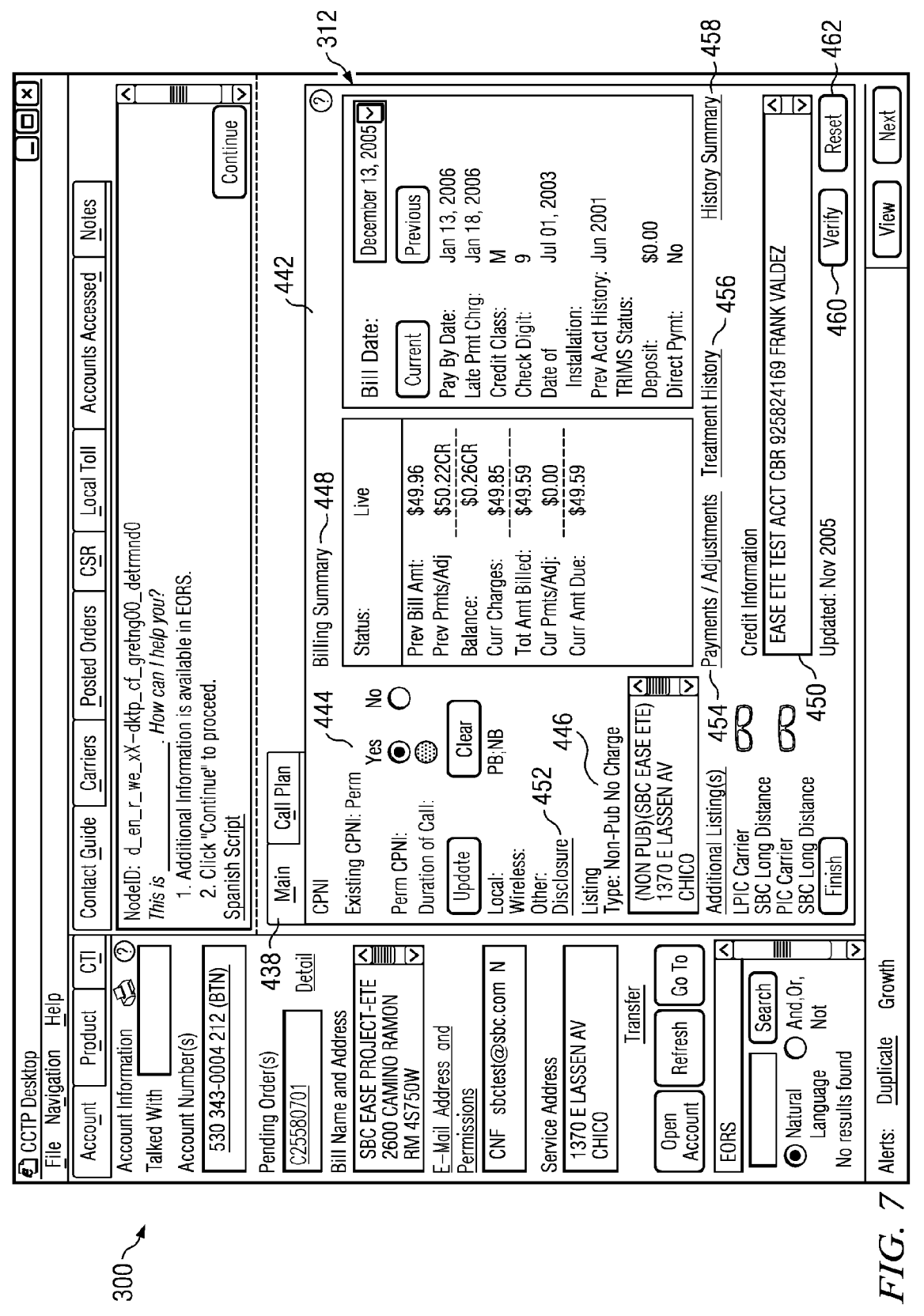

In the illustrated example, selection of the main tab 438 causes an overall customer billing window 442 to be displayed in the action section 312 as shown in FIG. 7. The overall customer billing window 442 includes customer history and other potentially helpful information for an agent regarding a customer as well as interactive fields to update the customer accounts as will be explained below. The customer billing window includes a customer proprietary network information (CPNI) area 444, a listing area 446, a billing summary area 448 and a credit information area 450. The CPNI area 444 includes data regarding the phone network associated with the customer. The CPNI area 444 may contain various permissions for offering products to the customer in the telephone service area. The CPNI area 444 includes a disclosure link 452 which results in the display of a legal disclosure text. The listing area 446 contains public information such as phone book listings for the customer. The billing summary area 448 contains information regarding the current bill to the customer, the history of the transactions with the customer and other billing information. The billing summary area 448 includes a payments adjustments link 454, a treatment history link 456 and a history summary link 458. The payments adjustments link 454 opens a pop up window with a description of the last transaction with the customer. The treatment history link 456 opens a pop up window showing the last instance of customer issues with bill payments such as delinquent payments. The history summary link 458 brings up a pop up window which shows debit and credit account information for the customer. The credit information area 450 includes information which is necessary to confirm the credit rating and/or identity of a customer. The credit information may be two alternate contacts individuals. The information in the credit information area 450 may be changed by the agent based on more accurate information received from the customer. The credit information area 450 includes a verify button 460 and a reset button 462. The verify button 460 allows a user to confirm changes to the credit contact information. The reset button 462 allows a reset of the previous information in the credit information area 450.

Returning to FIG. 3, when the call plan tab 440 is selected, an actions window 480 is displayed in the action section 312. The actions window 480 in the illustrated example is divided into a first tier actions column 482, a second tier actions column 484, a third tier actions column 486 and a transaction status column 488. The actions columns 482-486 each display different actions available to the agent on behalf of the customer. The transaction status column 488 show the status of the actions which are initiated by the agent.

In the illustrated example, the first tier actions column 482 includes main categories of actions including a billing selection 490, a collections selection 492, an ordering selection 494, a repair selection 496 and an account maintenance selection 498. The second tier actions column 484 lists a variety of actions available under each of the action selections 490-98 in the first tier actions column 482. For example, under the collections selection 498, the agent can take actions such as confirm receipt of payment, make a payment, restore service, make a promise to pay and/or find a payment location. Some specific actions in the second tier actions column 484 include additional action choices which are listed in the third tier actions column 486. For example, under the billing selection 490, an agent may select either a company billing selection 500 or affiliate billing selection 502. These selections 500 and 502 have a symbol, in this example a plus icon, which signifies another range of actions available to the agent if such actions are selected. When the agent selects either the company billing selection 500 or the affiliate billing selection 502, a range of additional actions is displayed in the third tier column 486. When the additional actions are displayed, the plus symbol is changed to a minus symbol as shown in affiliate billing selection 502 shown in the example in FIG. 3. Of course, those of ordinary skill in the art will appreciate that other symbols or indicators may be used.

When an agent selects one of the listed actions in either the second tier or third tier actions columns 484 or 486, an action tag is displayed in the transactions status column 488. In the example shown in FIG. 3, an agent has selected the third tier action of long distance billing 504 which appears as an action from the affiliate billing selection 502. A long distance billing tag 506 then appears in the transactions status column 488 as shown in the example in FIG. 3. When the action is taken, different symbols will appear on the tag to specify the status of the action. For example, the long distance billing tag 506 in the transaction status column 488 has a check mark symbol. The action taken is automatically recorded in the notes window 350 shown in FIG. 5.

Figure 8:
FIG. 8 is a screen shot of the example call plan screen displayed in the action section of the example user interface of FIG. 3.

Additional tabs may appear to provide additional window options for the actions selected in the action section 312. For example, FIG. 8 shows the user interface configuration 300 after an agent has almost completed a session assisting a customer. In this configuration, the agent may select the main tab 438 or the call plan tab 440 as explained above. Additional tabs are now displayed including a bill tab 510, a repair tab 512 and an offer tab 514 which are generated by the actions available in the first and second tier columns 482 and 484. In the example session, the agent first selected company billing which displayed the bill explanation action in the second tier action column 484. The bill explanation action allows the display of the bill tab 510 which will be explained below in FIG. 9. Additional tabs such as a repair tab 512 and an offer tab 514 are also displayed as a result of actions such as reporting trouble for the repair tab 512 or change service for the offer tab 514 which are available to the agent in the second tier actions column 484.

In the illustrated example, the duplicate bill action has been selected by the agent which results in a duplicate bill action tag to appear in the transaction status column 488. A duplicate bill entry 516 appears in a different color in the third tier action column 484 to signify the action has been selected. The transaction status column 488 displays the action tags in the order that is optimal for handling the actions. The action tags in the transaction status column 488 may have different symbols which signify the status of the action. A "C" symbol means the action is complete. An "X" symbol means the action was canceled by request of the customer. A check mark symbol means the action has not been sequenced for performance by the agent and/or tools on the interface. A "P" symbol means the action is in progress. An "S" symbol means the action has been sequenced for performance. An "I" symbol means the action was incomplete because the call was interrupted. In this example, the duplicate bill action has just been selected, and thus, has not been sequenced. Of course, those of ordinary skill in the art will appreciate that other characters or symbols may be used. The remaining action tags in the transaction status column 488 in this example show that the bill explanation action has been completed and the actions of reporting trouble and long distance billing were canceled.

Figure 9:
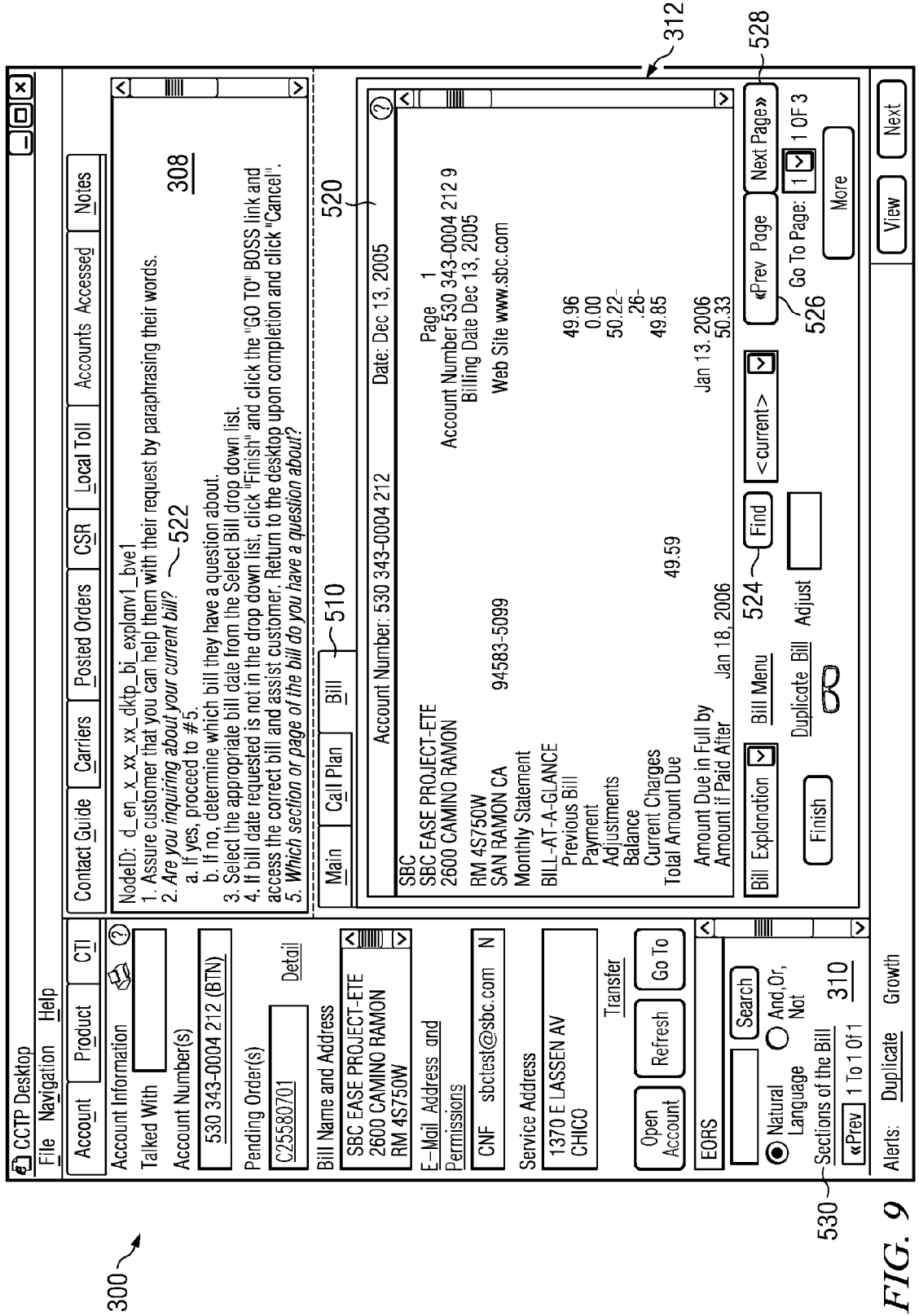
FIG. 9 is a screen shot of an example bill detail window displaying the action section of the example user interface shown in FIG. 8.

FIG. 9 shows an example bill detail window 520 displayed in the action section 312 when the bill tab 510 is selected in FIG. 8. As may be seen in the communication section 308 shown in FIG. 9, an appropriate script 522 has been displayed which relates to assisting a customer with answering questions with regard to the bill. The bill detail window 520 displays a copy of the current bill to the customer to assist the agent in answering questions regarding the bill. Navigations buttons such as a find button 524, a previous page button 526 and a next page button 528 enable an agent to display other bills relating to the customer.

Figure 10A:
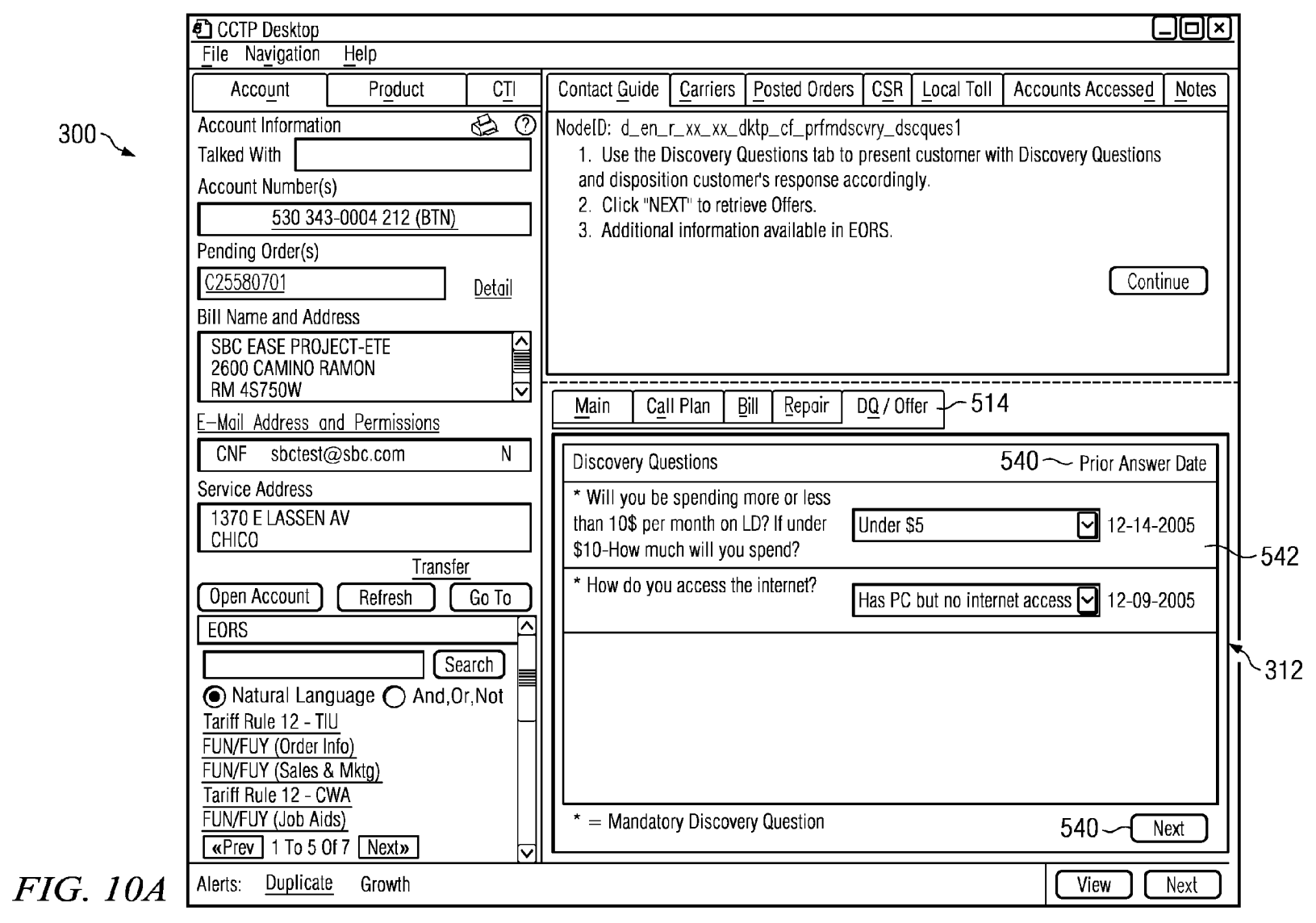

FIGS. 10A & 10B shows a sequence of offering windows which are displayed in response to the selecting the offer tab 514. The selection of the offer tab 514 enables an agent to offer a customer additional products or services after the items relating to the original phone conversation have been concluded. FIG. 10A shows a first offering window 540 which is displayed in the action section 312. The first offering window 540 has a series of discovery questions 542 which enable an agent to find out a customer's potential need for products via a menu of potential answers. After answering the questions, additional windows are displayed via a next button 544.

FIG. 10B shows a second offering window 550 which is displayed in the action section 312 as a result of answering the discovery questions 542 displayed in the first offering window 540 in FIG. 10A. The second offering window 550 has an offers area 552, a pricing area 554 and an information area 556. The offers section 552 has a recommended offers tab 558 and an additional offers tab 560. The recommended offers tab 558 is selected in FIG. 10B and displays potential products for the customer. Selecting the additional offers tab 560 displays additional products which may be appropriate for the customer. The pricing area 554 display information about cost savings made to the customer for the various offers in the offers area 552.

The information area 556 displays information and text explaining the selected offer in the offer area 552 for the agent to communicate to the customer. The information area 556 has a number of tabs 562 which allow selection of different text relating to the offer. In this example, the tabs 562 allow an agent to access text relating to the benefits of the offer, statements needed to transition to the product, legal disclosures etc.

Returning to FIG. 3, the support section 310 in the illustrated example is designed to display just in time support information to the agent. Such support information may include information to explain customer requests or the processes in the active areas 304. The support section 310 has a search term field 570 and a search button 572. An agent may enter a search term in the search term field 570 and select the search button 572 to initiate a search that results in a pop up window which will be explained with reference to FIG. 11. The support section 310 has a natural language search option 574 and a Boolean search option 576 which enables different search strategies. The support section 310 also has a display area 578 which contains information links relating to the actions in both the communicate section 306 and the act section 308 displayed by the agent. The information links displayed is predictive of background and overview information that is likely to be relevant to the particular information in those sections. For example, as shown in FIG. 9, a sections of the bill link 530 appears in the support section 310 to assist the agent in further explanation of the customer bill. Selecting the link 530 brings up a pop up window with text which explains the different sections of the bill.

Figure 11:
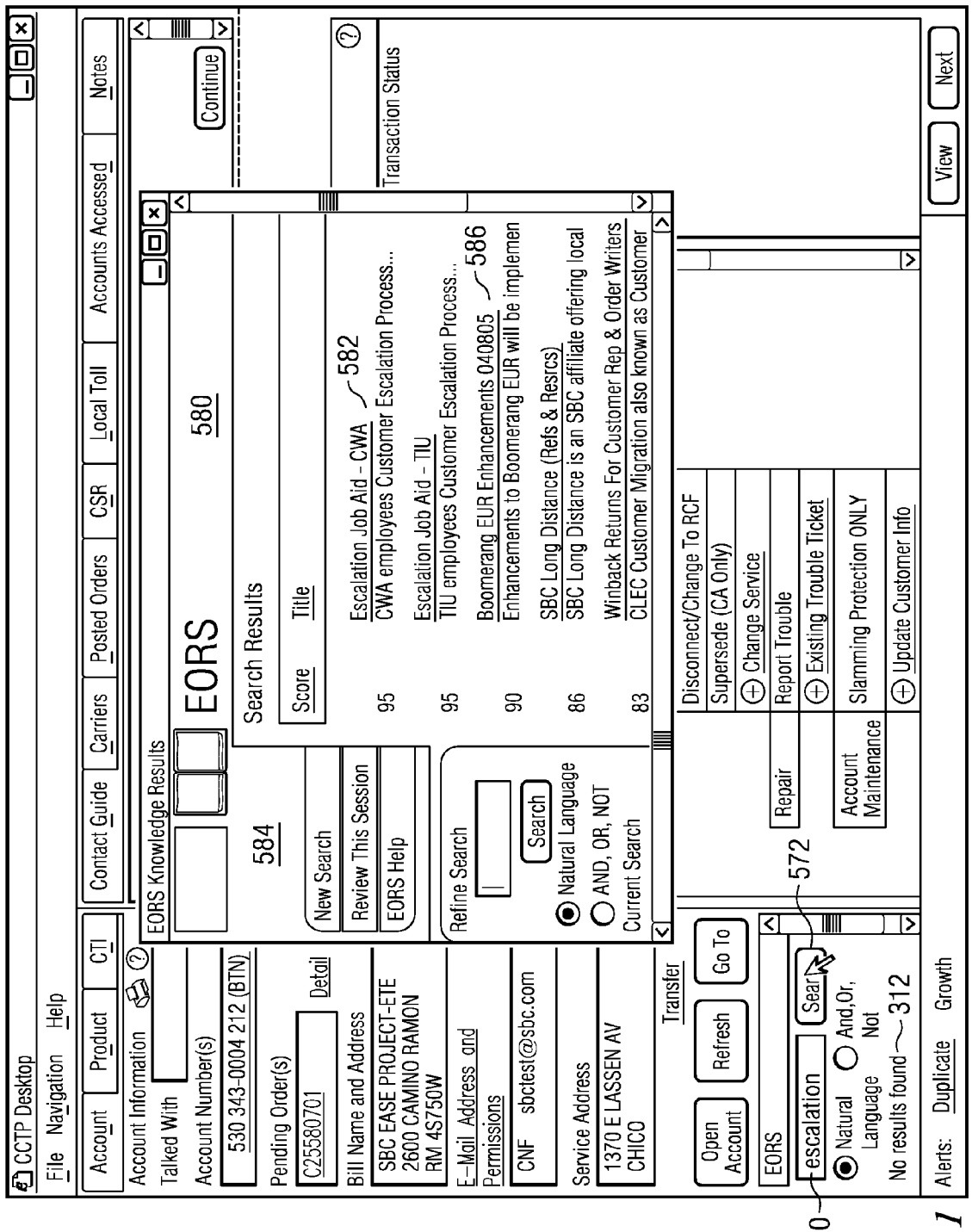
FIG. 11 is a screen shot of an example popup window activated with a search initiated from the support section of the example user interface of FIG. 3.

FIG. 11 shows an example search result window 580 which is returned in response to entering a search term in the search field 570 and selecting the search button 572 in the support section 310. The search result window 580 contains a results area 582 and a search control area 584. The results area 582 contains further links 586 for different topics which relate to the search request. The further links 586 when selected causes additional popup information windows to be displayed with detailed information relating to the search term. The search control area 584 contains different options for initiating a new search, and/or refining an existing search.

Figure 12:
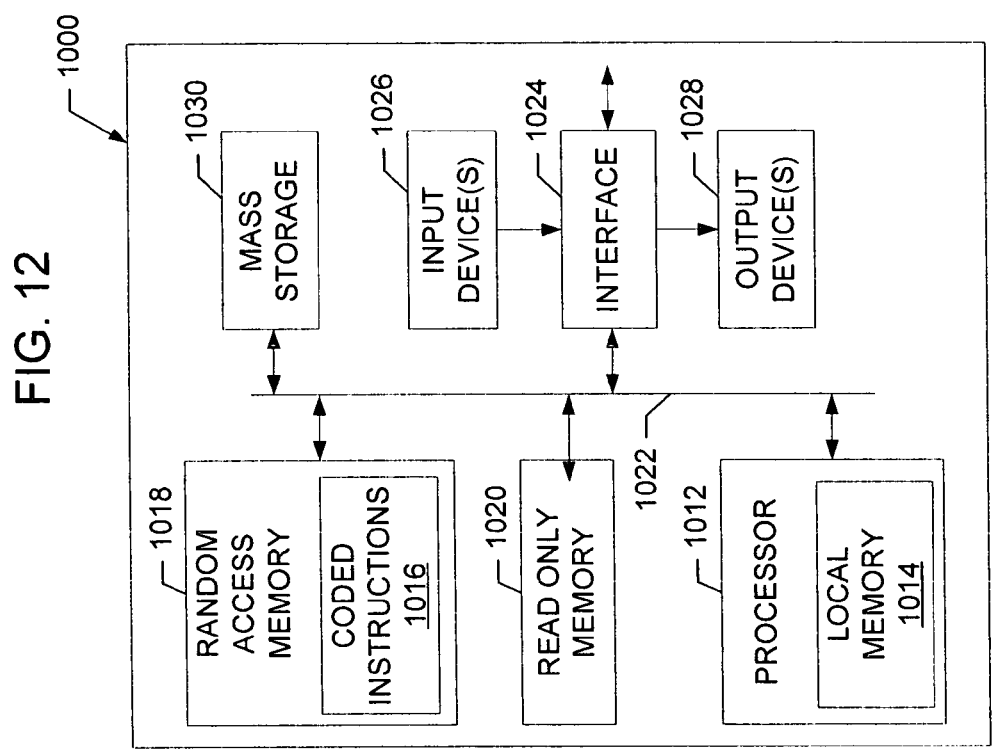
FIG. 12 is a block diagram of an example agent terminal used to display the example user interface of FIG. 3.

FIG. 12 is a schematic diagram of an example processor platform 1000 which may be used for the terminals 152 and/or 154 capable of implementing the example machine readable instructions illustrated in FIGS. 3-11. For example, the processor platform 1000 can be implemented by one or more general purpose microprocessors, microcontrollers, etc. The processor platform 1000 of the example includes the processor 1012 that is a general purpose programmable processor. The processor 1012 executes coded instructions present in a memory 1020 of the processor 1012. The processor 1012 may be any type of processing unit, such as a microprocessor. The processor 1012 includes a local memory 1014. The processor 1012 may execute, among other things, the example machine readable instructions illustrated in FIGS. 1-11.

The processor 1012 is in communication with the main memory including a read only memory (ROM) 1020 and/or a RAM 1018 via a bus 1022. The RAM 1018 may be implemented by Synchronous Dynamic Random Access Memory (SDRAM), Dynamic DRAM, and/or any other type of RAM device. The ROM 1020 may be implemented by flash memory and/or any other desired type of memory device.

Access to the memory space 1020 and 1018 is typically controlled by a memory controller (not shown) in a conventional manner. The RAM 1018 may be used by the processor 1012 to implement the memory 1020, and/or to store coded instructions 1016 that can be executed to implement the example machine readable instructions illustrated in FIGS. 1-11.

The processor platform 1000 also includes a conventional interface circuit 1024. The interface circuit 1024 may be implemented by any type of well known interface standard, such as an external memory interface, serial port, general purpose input/output, etc. One or more input devices 1026 are connected to the interface circuit 1024. One or more output devices 1028 are also connected to the interface circuit 1024. Additional permanent storage may be offered via a mass storage device 1030 which may be a hard drive. In the illustrated example, a telephone or telephony equipment may be part of the input devices 1026.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Further, while the forgoing describes systems and processes for providing support to customers of a telecommunications provider, persons of ordinary skill in the art will recognize that the forgoing systems and processes may be used to provide support to customers of any type of business. For example, the forgoing systems and processes may be used to provide support to customers of a credit card distributor, an electronics manufacturer, a cable television and/or internet provider, a satellite television and/or internet provider, a computer manufacturer or retailer, a cellular phone service provider, a bank, a securities brokerage business, an internet retailer, etc.

This patent contemplate examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A user interface for a call center representative workstation, the workstation usable by a call center representative to respond to a customer inquiry, the user interface comprising:
    a passive focus screen area to display at least one of customer data and a reason for the customer inquiry to the call center;
    an active communicate screen area adjacent to the passive focus screen area, the active communicate screen area to display a script of dialog relating to the customer inquiry, the script of dialog selected from a plurality of scripts relating to at least one of the customer data and the reason for the customer inquiry to the call center;
    an active actions screen area adjacent to the passive focus screen area, the active actions screen area to display information to launch an action to facilitate a response to the customer inquiry and the status of actions selected by the call center representative, the active actions screen area includes a column including at least one potential action available to the call center representative, and an active transactions column which shows the status of at least one action taken by the call center representative; and
    a passive support screen area to display information relating to actions available to the call center representative in the active communicate and actions screen areas, the information displayed being changed dependent on the specific action selected by the call center representative in either the active communicate or actions screen areas.

2. A user interface for a call center representative workstation, the workstation usable by a call center representative to respond to a customer inquiry, the user interface comprising:
    a passive focus screen area to display at least one of customer data and a reason for the customer inquiry to the call center;

an active communicate screen area to display a script of dialog relating to the customer inquiry; and an active actions screen area to display information to launch an action to facilitate a response to the customer inquiry, the active actions screen area includes a column including at least one potential action available to the call center representative, and an active transactions column which shows the status of at least one action taken by the call center representative.

3. The user interface of claim 2 further comprising a passive support screen area to display information relating to actions available to the call center representative in the active communicate and active actions screen areas.

4. The user interface of claim 3 wherein the passive focus and support screen areas are arranged adjacent to the active communicate and active actions screen areas.

5. The user interface of claim 3 wherein the information displayed in the passive support screen is changed dependent on the specific action selected by the call center representative in either the active communicate or active actions screen areas.

6. The user interface of claim 2 wherein the script is selected from a plurality of scripts relating to at least one of the customer data and the reason for the customer inquiry to the call center.

7. The user interface of claim 2 wherein the active communicate screen area includes instructions relating to the script.

8. The user interface of claim 2 wherein the active actions screen area includes at least one link to display a screen area to perform a potential action.

9. A call center system for a call center representative to answer calls from customers of a business, the call center system comprising:
a database to store customer data;
a script generator to provide scripts to facilitate dialog with a customer; and
an agent terminal communicatively coupled to the database and the script generator, the agent terminal including a telephone and a user interface having a passive focus screen area to display customer data and a reason for a customer inquiry; an active communicate screen area to display a script; a passive support screen area to display information relating to at least one action available to the call center agent in the active communicate screen area; and an active actions screen area to select at least one action to support response to the customer inquiry, wherein the active actions screen area includes a column including at least one potential action available to the call center representative, and an active transactions column which shows the status of at least one action taken by the call center representative, the active actions screen area including a column having at least one potential action available to the call center representative, and an active transactions column which shows the status of at least one action taken by the call center representative.

10. A method of responding to a customer inquiry to a call center, the method comprising:
displaying a user interface having an active communicate screen area and an active actions screen area for a call center representative work station;
displaying a passive focus screen area to display at least one of customer data and a reason for the customer inquiry to the call center;
displaying a script in the active communicate screen area; and
launching an action from the active actions screen area to facilitate response to the customer inquiry; wherein the active actions screen area includes a column including at least one potential action available to the call center representative, and an active transactions column which shows the status of at least one action taken by the call center representative.

11. The method of claim 10 further comprising displaying a passive support screen area to display information relating to actions available to the call center representative in the active communicate and active actions screen areas.

12. The method of claim 11 further comprising changing the information displayed in the passive support screen in response to an action taken in either the active communicate or active actions screen areas.

13. The method of claim 10 wherein the script is selected from a plurality of scripts relating to at least one of the customer data and the reason for the customer inquiry to the call center.

14. The method of claim 10 wherein the active actions screen area includes at least one link to display a screen area to perform a potential action.

15. An article of manufacture storing machine readable instructions which, when executed, cause a machine to:
display a user interface having an active communicate screen area and an active actions screen area for a call center representative work station;
display a passive focus screen area to display at least one of customer data and a reason for the customer inquiry to the call center;
display a script in the active communicate screen area; and
launch an action from the active actions screen area to facilitate response to the customer inquiry; wherein the active actions screen area includes a column including at least one potential action available to the call center representative, and an active transactions column which shows the status of at least one action taken by the call center representative.

16. The system of claim 9 wherein the information displayed in the passive support screen is changed in response to an action selected by the call center representative in either the active communicate or active actions screen areas.

17. The system of claim 9 wherein the script is selected from a plurality of scripts relating to at least one of the customer data and the reason for the customer inquiry to the call center.

18. The system of claim 9 wherein the active communicate screen area includes instructions relating to the script.

19. The article of manufacture of claim 15, wherein, when executed, the machine readable instructions cause the machine to display a passive support screen area displaying information relating to actions available to the call center representative in the active communicate and active actions screen areas.

20. The article of manufacture of claim 19, wherein, when executed, the machine readable instructions cause the machine to change the information displayed in the passive support screen in response to an action taken in either the active communicate or active actions screen areas.

21. The article of manufacture of claim 15 wherein the script is selected from a plurality of scripts relating to at least one of the customer data and the reason for the customer inquiry to the call center.

22. The article of manufacture of claim 15 wherein the active actions screen area includes at least one link to display a screen area to perform a potential action.

* * * * *

UNITED STATES PATENT AND TRADEMARK OFFICE
CERTIFICATE OF CORRECTION

PATENT NO. : 7,593,522 B2
APPLICATION NO. : 11/372285
DATED : September 22, 2009
INVENTOR(S) : Rachel Parker-Stephen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 503 days.

Signed and Sealed this

Twenty-first Day of September, 2010

David J. Kappos
*Director of the United States Patent and Trademark Office*